(12) United States Patent
Macor

(10) Patent No.: US 6,230,003 B1
(45) Date of Patent: May 8, 2001

(54) TELEPHONE CALLING CARD HAVING A WIRELESS RECEIVER FOR RECEIVING NOTIFICATION OF ARRIVED MESSAGES

(75) Inventor: James Macor, Jackson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/061,677

(22) Filed: Apr. 16, 1998

(51) Int. Cl.[7] ............................. H04M 11/10; G08B 5/22
(52) U.S. Cl. ................ 455/412; 340/825.44; 379/93.24; 379/93.22; 379/88.14; 455/351; 455/558
(58) Field of Search ........................................ 455/412, 413, 455/406, 347, 349, 351, 90, 38.1, 558; 340/825.44; 379/93.22, 93.24, 88.14

(56) References Cited

U.S. PATENT DOCUMENTS

| D. 331,055 | * | 11/1992 | Massey et al. ................. D14/146 |
| D. 351,162 | * | 10/1994 | Kwon et al. .................... D14/146 |
| D. 351,163 | * | 10/1994 | Kwon et al. .................... D14/146 |
| 4,797,914 | * | 1/1989 | Vaello ............................ 379/93.22 |
| 4,935,745 | * | 6/1990 | Mori et al. ........................ 455/90 |
| 5,192,947 | * | 3/1993 | Neustein .................... 340/825.44 |
| 5,245,245 | * | 9/1993 | Goldenberg ............... 340/825.44 |
| 5,307,508 | * | 4/1994 | Rollins et al. ................... 455/351 |
| 5,317,308 | * | 5/1994 | Tribbey et al. ............. 340/825.44 |
| 5,369,399 | * | 11/1994 | Tribbey et al. ............. 340/825.44 |
| 5,479,408 | * | 12/1995 | Will ............................ 340/825.44 |
| 5,511,114 | * | 4/1996 | Stimson et al. .................. 379/114 |
| 5,675,627 | * | 10/1997 | Yaker .......................... 340/825.44 |
| 5,793,861 | * | 8/1998 | Haigh ............................... 379/266 |
| 5,796,394 | * | 8/1998 | Wicks et al. ...................... 345/229 |
| 5,870,454 | * | 2/1999 | Dahlén ........................... 379/88.14 |
| 5,905,777 | * | 5/1999 | Foladare et al. ................. 455/414 |
| 5,930,350 | * | 7/1999 | Johnson ............................ 379/355 |
| 5,950,919 | * | 9/1999 | Adams ............................... 232/34 |
| 5,952,931 | * | 9/1999 | Chotichanon et al. .......... 340/649 |
| 5,953,504 | * | 9/1999 | Sokal et al. ................... 379/93.22 |
| 6,023,700 | * | 2/2000 | Owens et al. ..................... 707/10 |
| 6,061,718 | * | 5/2000 | Nelson .......................... 379/88.14 |

* cited by examiner

Primary Examiner—Edward F. Urban
Assistant Examiner—Rafael Perez-Gutierrez
(74) Attorney, Agent, or Firm—Mayer, Fortcort & Williams

(57) ABSTRACT

A method and apparatus is provided for notifying a subscriber via a telephone calling card that a message has arrived at the message center of a service subscriber. The messaging center may be a voice mail or e-mail system. In accordance with the method, the service provider receives and stores an incoming message for the subscriber. The service provider then transmits a radio signal to the telephone calling card of the subscriber indicating that the incoming message has arrived.

27 Claims, 2 Drawing Sheets

TELEPHONE CALLING CARD HAVING A WIRELESS RECEIVER FOR RECEIVING NOTIFICATION OF ARRIVED MESSAGES

TECHNICAL FIELD OF THE INVENTION

The present invention relates generally to telephone calling cards, and more particularly to a telephone calling card capable of receiving notification that a message has arrived at a messaging system.

BACKGROUND OF THE INVENTION

As the prevalence of electronic mail ("e-mail") and voice mail systems increases, subscribers feel a growing need to retrieve such mail virtually as soon as it arrives. However, to promptly receive an incoming message requires that a subscriber who is away from his or her home or office carry a wireless telephone or a portable computer. In many cases this is not a practical approach because of the size and expense of such devices. However, it may be sufficient if the subscriber is simply notified when such mail arrives. Once notified, the user can then use a nearby telephone or computer terminal to retrieve the message.

Accordingly, it would be desirable to provide a small, inexpensive device that can notify a subscriber when an e-mail or voice mail message has arrived.

SUMMARY OF THE INVENTION

In accordance with the present invention, a method and apparatus is provided for notifying a subscriber via a telephone calling card that a message has arrived at the message center of a service subscriber. The messaging center may be a voice mail or e-mail system. In accordance with the method, the service provider receives and stores an incoming message for the subscriber. The service provider then transmits a radio signal to the telephone calling card of the subscriber indicating that the incoming message has arrived.

In one embodiment of the invention the telephone calling card includes a housing having a planar surface substantially equal in dimension to a credit card. An encoded data strip extends over the planar surface for transmitting encoded data to a card reader. A wireless receiver is embedded in the housing for receiving the radio signal that indicates notification of the arrived message. A receiver that is suitably compact for this purpose is a slimline antenna such as the Murata chip antenna available from Murata, Inc. A processor and memory are embedded in the housing for processing and storing the received notification of the arrived message. A display extends over the planar surface for displaying the notification of the arrived message. Such a notification may include, for example, the type of message that has arrived (e.g., voice or e-mail), the time at which the message was received, and the telephone number or e-mail address of the calling party.

DETAILED DESCRIPTION

Figure 1:
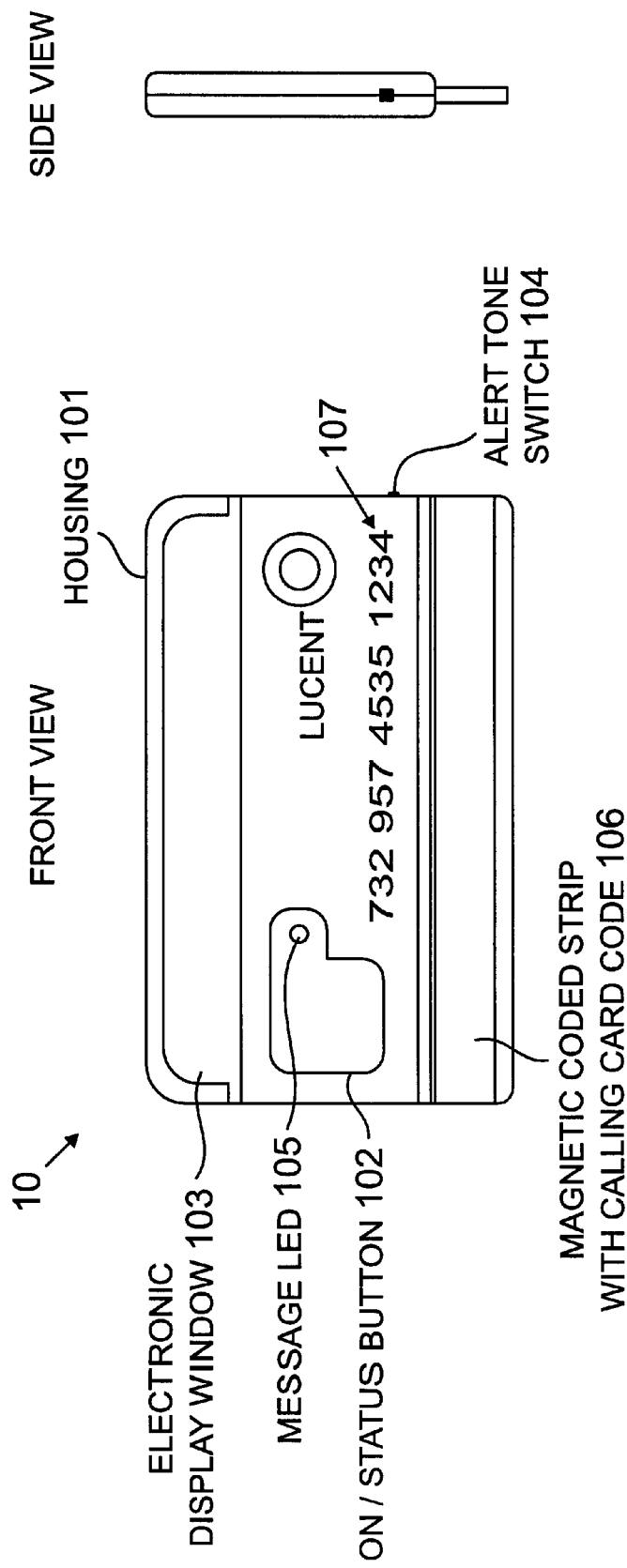
FIG. 1 shows one embodiment of a telephone calling card having a receiver embedded therein constructed in accordance with the present invention.
Figure 2:
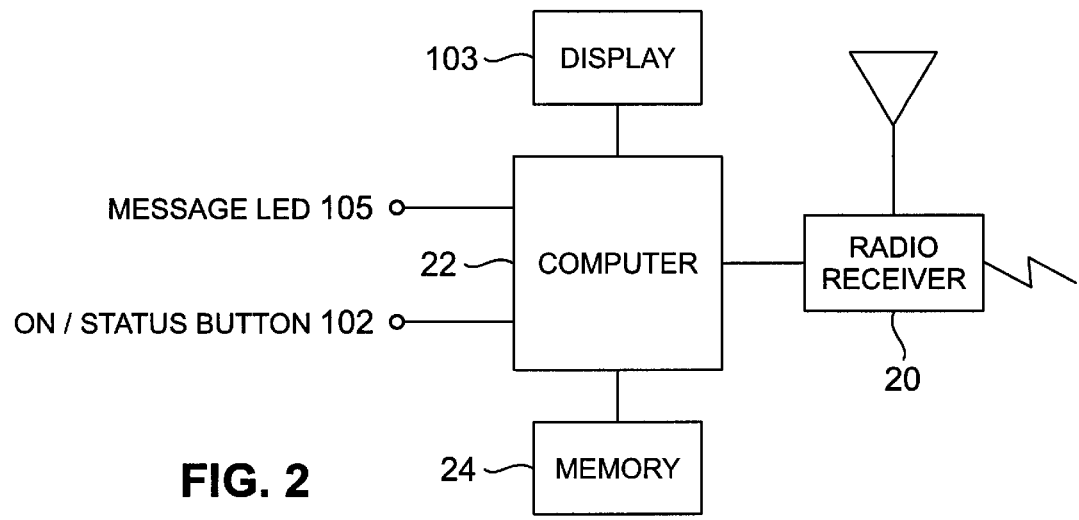
FIG. 2 shows a simplified block diagram of the calling card shown in FIG. 1.

FIG. 1 shows a device 10 constructed in accordance with the present invention for notifying a voice mail or e-mail subscriber that a message has arrived. The device 10 is embodied in a credit-card sized housing 101 which can be conveniently carried on the subscriber's person in a pocket or wallet, for example. As shown in the simplified block diagram of FIG. 2, embedded within the housing 101 is a wireless receiver 20, a processor 22, memory 24 and an electronic display 103 that extends over the housing surface. A receiver that is suitably compact for this purpose is a slimline antenna such as the Murata chip antenna available from Murata, Inc. The display 103 identifies the type of message that has arrived as either a voice or e-mail message. The display 103 also shows the time the message arrived and the address of the caller (i.e., a telephone number or e-mail address). Depressing push-button 102 activates the display 103. A message indicator 105 such as an LED and/or a transducer, for example, alerts the subscriber that a message has arrived by visual or audio means. If desired, the indicator 105 can be deactivated, or possible altered between audio and visual indicating states, by any convenient means, such as by providing a small hole containing a recessed switch that is accessed by an object such as a pen. A magnetically encoded data strip 106 stores information such as a conventional telephone calling card number, for example, so that a telephone call may be placed from a public telephone equipped with an appropriate magnetic card reader. Likewise, a label 107 is provided on the front of housing 101 listing the telephone calling card number so that a subscriber may place a call by manually inputting the number into the telephone.

Figure 3:
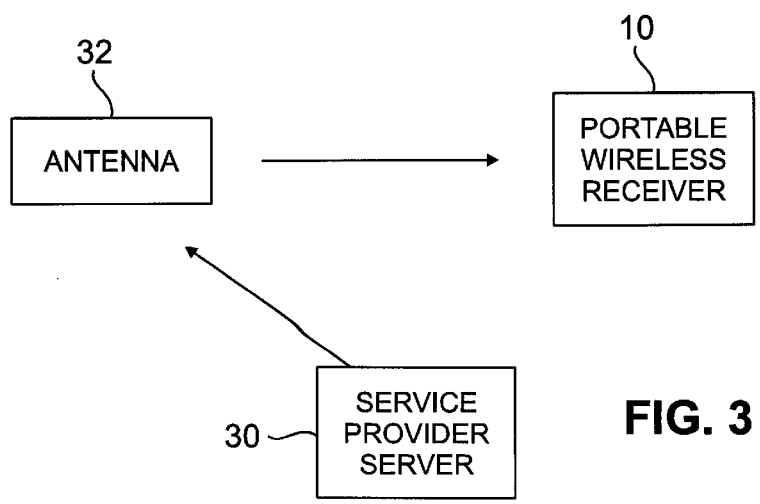
FIG. 3 shows a service provider forwarding notification of an arrived message to the calling card device of FIG. 1.

In operation, the device 10 functions as a conventional telephone calling card and as a device for receiving notification that a voice or e-mail message has arrived on the subscriber's telephone voice mail system or computer. The server 30 includes a voice messaging system and an electronic mail system for receiving the incoming message over a telephone or computer network. Upon receiving an incoming message, the service provider transmits a radio-frequency signal to the device 10 via an antenna or satellite system. The signal, which contains the information regarding the arrived message, is received by receiver 20 and processed by processor 22 in a conventional manner so that indicator 105 is activated and the decoded information is directed to the display 103. For example, in the system shown in FIG. 3, a service provider server 30 transmits the wireless notification of an arrived message to the device 10 via an antenna 32.

Upon receiving notification of an arrived message, the subscriber may locate a convenient telephone or computer terminal to retrieve the arrived message using one of the conventional calling card features of the device 10. E-mail messages may be displayed on the telephone display if the telephone is so equipped. Alternatively, e-mail may undergo text-to-speech processing so that it can be relayed as an audio message over the telephone. Suitable text-to-speech processing systems are commercially available. Of course, the subscriber could forgo the opportunity to retrieve the arrived message and could directly contact the caller whose address is shown in display 103.

What is claimed is:

1. A telephone calling card, comprising:

a housing having a planar surface substantially equal in dimension to a credit card;

an enclosed data strip extending over said planar surface for transmitting encoded data to a card reader;

a wireless receiver embedded in said housing for receiving notification of an arrived message;

a processor and memory embedded in said housing for processing and storing said received notification;

means for interacting with a secondary interface device to retrieve said arrived message; and a display extending over said planar surface for displaying said notification of the arrived message, wherein said secondary interface device is a public telephone system and further wherein said pubic telephone system is equipped with a display for displaying email messages.

2. The card of claim 1 wherein said notification of the arrived message includes a time at which said arrived message was received.

3. The card of claim 2 wherein said notification of the arrived message includes a caller identifier.

4. The card of claim 3 wherein said caller identifier is an e-mail address.

5. The card of claim 3 wherein said encoded data is a telephone calling card number.

6. The card of claim 5 wherein said caller identifier is a telephone number.

7. The card of claim 1 wherein said encoded data is an authenticating account number.

8. The card of claim 1 wherein said encoded data is a telephone calling card number.

9. The card of claim 1 further comprising a label disposed on said planar surface identifying a telephone calling card number.

10. The card of claim 1, wherein email messages undergo text-to-speech processing and are relayed as an audio message over said public telephone system.

11. The card of claim 1 further comprising a manually operable switch for activating and deactivating the display.

12. The card of claim 11 wherein said switch is a push-button.

13. The card of claim 12 wherein said push-button has a plurality of states, and said display, responsive to said states, displays for each state a previously received notification of an arrived message.

14. The card of claim 1 further comprising an indicator coupled to said processor for activation upon receipt of the notification of an arrived message.

15. The card of claim 14 wherein said indicator is an audible alarm.

16. The card of claim 14 wherein said indicator is a light emitting diode.

17. A method of receiving a notification that a message has arrived for a telephone calling card subscriber and retrieving the message, said method comprising the steps of:

receiving a radio signal at the telephone calling card of a subscriber indicating that an electronic message has arrived at a remote location;

displaying on the telephone calling card notification of the arrived message; and means for retrieving the arrived message by means of the telephone calling card interacting with a secondary interface device, wherein said secondary interface device is a public telephone system and further wherein said public telephone system is equipped with a display for displaying email messages.

18. The method of claim 17 wherein said telephone calling card includes a housing having a planar surface substantially equal in dimension to a credit card;

an encoded data strip extending over said planar surface for transmitting encoded data to a card reader;

a wireless receiver embedded in said housing for receiving the radio signal that indicates notification of the arrived message;

a processor and memory embedded in said housing for processing and storing said received notification; and a display extending over said planar surface for displaying said notification of the arrived message.

19. The method of claim 17 further comprising the step of indicating that notification has been received prior to the step of displaying.

20. The method of claim 19 wherein said indicating step is performed audibly.

21. The method of claim 19 wherein said indicating step is performed visually.

22. The method of claim 17 wherein the notification displaying step further includes the step of displaying a time at which said message arrived.

23. The method of claim 22 wherein the notification displaying step includes a caller identifier.

24. The method of claim 23 wherein said caller identifier is a telephone number.

25. The method of claim 23 wherein said caller identifier is an e-mail address.

26. A method of notifying a telephone calling card subscriber that a message has arrived and retrieving the message, said method comprising the steps of:

receiving and storing an incoming message for the subscriber;

transmitting a radio signal to a telephone calling card of the subscriber indicating that the incoming message has arrived; and retrieving said incoming message by means of the telephone calling card interacting with a secondary interface device, wherein said secondary interface device is a public telephone system and further wherein said public telephone system is equipped with a display for displaying email messages.

27. The method of claim 26 wherein said telephone calling card includes a housing having a planar surface substantially equal in dimension to a credit card;

an encoded data strip extending over said planar surface for transmitting encoded data to a card reader;

a wireless receiver embedded in said housing for receiving the radio signal that indicates notification of the arrived message;

a processor and memory embedded in said housing for processing and storing said received notification; and a display extending over said planar surface for displaying said notification of the arrived message.

* * * * *

UNITED STATES PATENT AND TRADEMARK OFFICE
CERTIFICATE OF CORRECTION

PATENT NO. : 6,230,003 B1
DATED : May 8, 2001
INVENTOR(S) : James Macor

It is certified that error appears in the above-identified patent and that said Letters Patent is hereby corrected as shown below:

Title page,
Title, after "RECEIVING", insert -- A --, and after "ARRIVED", insert -- EMAIL --.

Claim 1, column 2,
Line 67, before "notification", insert -- a --.
Line 67, after "arrived", insert -- email --.

Claim 1, column 3,
Lines 4 and 7, after "arrived", insert -- email --.

Claim 2, column 3,
Line 12, after "arrived", insert -- email --.
Line 13, before "message", insert -- email --.

Claim 3, column 3,
Line 15, after "arrived", insert -- email --.

Claim 13, column 3,
Line 39, after "arrived", insert -- email --.

Claim 14, column 3,
Line 42, after "arrived", insert -- email --.

Claim 17, column 3,
Line 47, after "that", delete -- a --, and insert -- an email --.
Line 49, before "message", insert -- email --.
Line 50, after "at", delete -- the --, and insert -- a wireless receiver in a --.
Line 51, after "an", delete -- electronic --, and insert -- email --.
Line 53, after "card", insert -- said --.
Lines 54 and 55, after "arrived", insert -- email --.
Line 55, before "retrieving", delete -- means for --.

Claim 18, column 4,
Line 9, after "indicates", insert -- a --.
Lines 10 and 14, after "arrived", insert -- email --.

Claim 19, column 4,
Line 16, after "that", insert -- said --.

UNITED STATES PATENT AND TRADEMARK OFFICE
CERTIFICATE OF CORRECTION

PATENT NO.    : 6,230,003 B1
DATED         : May 8, 2001
INVENTOR(S)   : James Macor It is certified that error appears in the above-identified patent and that said Letters Patent is hereby corrected as shown below:

Claim 22, column 4,
Line 23, before "includes", delete -- further --.
Line 24, after "said", insert -- email --.

Claim 26, column 4,
Line 32, after "that", delete -- a --, and insert -- an email --.
Line 33, before "message", insert -- email --.
Lines 34 and 40, after "incoming", insert -- email --.

Claim 27, column 4,
Lines 56 and 60, after "arrived", insert -- email --.

Signed and Sealed this

Twenty-seventh Day of November, 2001

*Attest:*

*Attesting Officer*

NICHOLAS P. GODICI
*Acting Director of the United States Patent and Trademark Office*